(12) United States Patent
Young (10) Patent No.: US 11,280,448 B1
(45) Date of Patent: Mar. 22, 2022

(54) BIPOD SUPPORT SYSTEM AND DEVICE FOR BINOCULARS

(71) Applicant: Rick Young, Boring, OR (US)

(72) Inventor: Rick Young, Boring, OR (US)

(*) Notice: Subject to any disclaimer, the term of this patent is extended or adjusted under 35 U.S.C. 154(b) by 0 days.

(21) Appl. No.: 17/177,993

(22) Filed: Feb. 17, 2021

(51) Int. Cl.
*F16M 13/06* (2006.01)
*F16M 11/24* (2006.01)

(52) U.S. Cl.
CPC .......... *F16M 11/242* (2013.01); *F16M 13/06* (2013.01)

(58) Field of Classification Search
CPC ............. F16M 11/242; F16M 2200/00; F16M 2200/08; F16M 13/08; F16M 13/04; F16M 13/06; F41A 23/10; F41A 23/00; F41A 23/16; F41A 23/08
USPC .... 248/163, 164, 166, 170, 440.1, 136, 137, 248/188; 42/90, 94; 89/37.01, 37.03, 89/37.04
See application file for complete search history.

(56) References Cited

U.S. PATENT DOCUMENTS

| | | | | |
|---|---|---|---|---|
| 748,387 A * | 12/1903 | Lilly | ..................... | B65F 1/1415 248/97 |
| 2,749,147 A * | 6/1956 | Herrschaft | ............... | A47B 3/12 248/431 |
| 2,841,352 A * | 7/1958 | Pappas | ................... | F16M 11/22 108/157.18 |
| 4,763,865 A * | 8/1988 | Danner | .................. | F16M 11/38 108/118 |
| 5,033,737 A * | 7/1991 | Moye | ..................... | A63K 3/043 482/17 |
| 5,311,693 A * | 5/1994 | Underwood | ........... | F41A 23/06 42/94 |
| 5,317,826 A * | 6/1994 | Underwood | ........... | F41A 23/06 403/223 |
| 5,358,204 A * | 10/1994 | Terada | ................... | F16M 11/38 108/118 |
| 5,406,732 A * | 4/1995 | Peterson | ................ | F41A 23/08 248/164 |
| 5,507,111 A * | 4/1996 | Stinson | ................... | F41A 23/08 42/94 |
| 5,857,649 A * | 1/1999 | Eason | .................... | F16M 11/38 248/164 |
| 5,930,932 A * | 8/1999 | Peterson | ................ | F41A 23/10 42/94 |
| 5,984,245 A * | 11/1999 | Hsu | ........................ | F16C 11/10 248/164 |
| 6,059,697 A * | 5/2000 | Breems | .................... | A61H 3/02 135/68 |
| 6,264,242 B1 * | 7/2001 | Lenhart | .................... | A45B 9/02 280/821 |
| 6,923,416 B1 * | 8/2005 | Hsieh | .................... | F16M 11/38 108/118 |

(Continued)

*Primary Examiner* — Nkeisha Smith
(74) *Attorney, Agent, or Firm* — Bretton L. Crockett; TechLaw Ventures, PLLC (57) ABSTRACT

Disclosed herein is an exemplary bipod device that includes a first shaft and a second shaft. The first and the second shaft are attached together by a connector. Also, attached to the first shaft is a first platform and attached to the second shaft is a second platform. Additionally, disclosed herein is an exemplary bipod system that includes a bipod comprising a first and a second shaft, and a connector connected to the first and second shaft. The bipod system further includes a first platform attached to the first shaft.

13 Claims, 3 Drawing Sheets

(56) References Cited

U.S. PATENT DOCUMENTS

| | | | | |
|---|---|---|---|---|
| 7,368,647 | B2* | 5/2008 | Hsieh | F16M 11/38 |
| | | | | 248/164 |
| 7,946,070 | B1* | 5/2011 | Elhart | F41A 23/16 |
| | | | | 42/94 |
| 9,200,859 | B2* | 12/2015 | Antell | F41A 23/10 |
| 9,557,131 | B1* | 1/2017 | Antell | F41A 23/10 |
| 9,609,925 | B2* | 4/2017 | Lenhart | A63C 11/227 |
| 9,746,268 | B2* | 8/2017 | Antell | F41A 23/10 |
| 10,264,860 | B1* | 4/2019 | Rau | F16M 13/08 |
| 10,627,182 | B2* | 4/2020 | Holmberg | F41A 23/10 |
| 10,724,681 | B2* | 7/2020 | Gearing | F16B 1/00 |
| 10,856,629 | B1* | 12/2020 | Unice | A45B 1/00 |
| 2003/0042388 | A1* | 3/2003 | Peterson | F16M 11/28 |
| | | | | 248/440.1 |
| 2010/0084524 | A1* | 4/2010 | Fai | F16M 13/00 |
| | | | | 248/170 |
| 2016/0135554 | A1* | 5/2016 | Green | A63C 11/00 |
| | | | | 135/66 |
| 2019/0093976 | A1* | 3/2019 | Power | F16F 9/34 |
| 2021/0010775 | A1* | 1/2021 | Wise | F41A 23/10 |

* cited by examiner

BIPOD SUPPORT SYSTEM AND DEVICE FOR BINOCULARS

BACKGROUND

According to depictions on cave walls people have been interacting with animals since the beginning of time. Our earliest ancestors watched animals both to protect themselves from dangerous animals and also for opportunities to harvest their next meal. Indeed, spotting animals at a distance was and continues to be a major advantage in both protection from dangerous animals and harvesting animals for food. As times changed people began watching animal not only for hunting but for observational enjoyment. Whatever the reason for observing wildlife, watching wildlife in its natural habitat often requires patience, precision, and persistence because wild animals are typically easily frightened by sight, sound, and smell. Frequently, animals often are found in places that are difficult for humans to reach particularly because many humans have poor abilities to approach undetected in difficult terrain. As a result, animals are best viewed at a distance. Modern optics, such as a scope or binoculars or other ocular enhancements allow humans to spot animals at a much greater distance than ever before without disrupting the animal in its natural state. Many animal watchers prefer binoculars over a spotting scope because binoculars allow the user to comfortably view a subject through both eyes, binoculars provide a wider field of view, and binoculars are much easier to use to visually trace the edges of a tree-line while looking for an out of place patter of a bird or an antler tine hidden amid dead tree branches. Binoculars are also more stable than spotting scopes in many cases, although, in some cases, the heartbeat or breathing of a user can reduce image stability in binoculars. Further, after an extended amount of time, the arms of a user may become weak or shaky which prevents the user from seeing an animal clearly.

What is needed is support for optical devices that provides improved image stability and helps to alleviate user fatigue.

SUMMARY

Disclosed herein is an exemplary bipod device that includes a first shaft and a second shaft. The first and the second shaft are attached together by a connector. Also, attached to the first shaft is a first platform. Attached to the second shaft is a second platform.

Also disclosed herein is an exemplary bipod system that includes a bipod comprising a first shaft, a second shaft, and a connector connected to the first shaft and the second shaft. The bipod system further includes a first platform attached to the first shaft.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
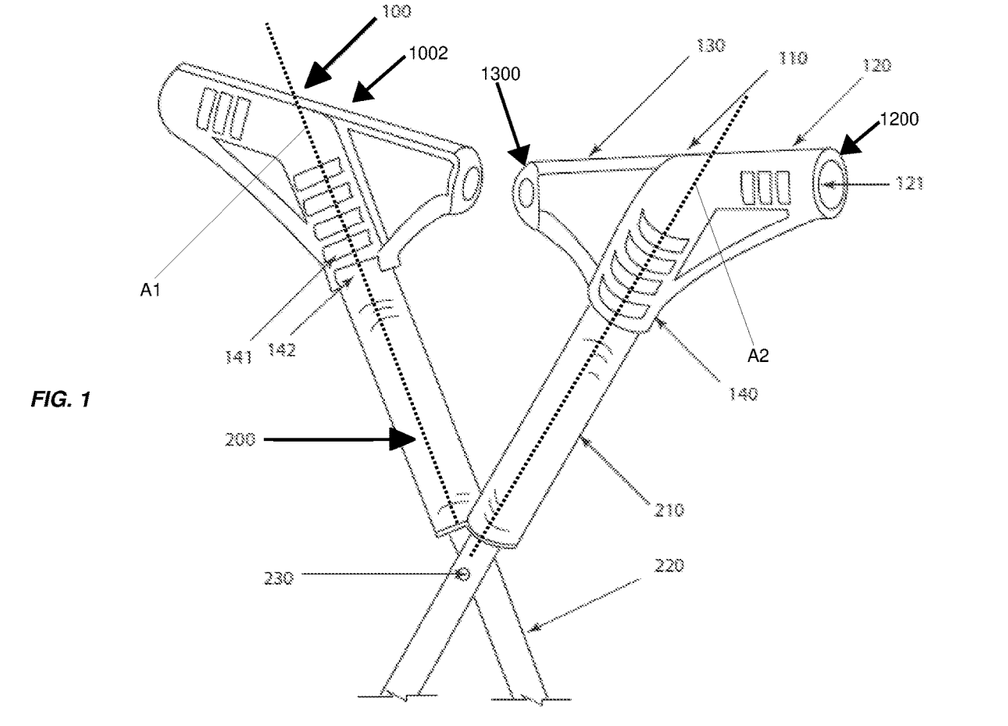
FIG. 1 is an illustrated view of the top portion of an open bipod support system and device.

FIG. 1 is an illustrated view of the top portion of open bipod support system and device 100. Bipod support system and device 100 may include support caps 110 attachable to the top end of each shaft 220. Support caps 110 placed on a top of each one of shafts 220 may work in tandem to create a dual platform. Support caps 110 may include a medial platform portion 130 near medial end 1300 and a lateral platform portion 120 near distal end 1200 with lateral portion 1002 therebetween. Support caps 110 may be attached to a top of shaft 220 through neck 140 of support caps 110. Attaching support caps 110 at top of shafts 220 may include using various techniques known in the art, i.e., adhesives, friction, clamps, rivets, bolts, screws, pins, and other fasteners. Alternatively, a top of shafts 220 may be threaded to match the threads of the support caps 110 to screw support caps 110 into place on a top of shafts 220. Support caps 110 may further include an aperture that may allow access to a cord, shown in FIG. 2, that attaches to a portion of shafts 220. This cord may be attached to shafts 220 to help ensure that the support caps 110 remain with shafts 220 even if support caps 110 were to be removed from the shaft purposefully or inadvertently. Support caps 110 may include a smaller aperture inset within aperture 121. The smaller inset aperture may be the same size or slightly larger than the cord, allowing the cord to pass through both the smaller inset aperture and aperture 121. The cord may attach directly to both support caps 110 and shafts 220. The cord may be attached to support cap 110 by including a knot or a stopper with a circumference that may be larger than the smaller inset aperture but smaller than aperture 121. This allows the knot or stopper to sit within aperture 121 without falling into shafts 220. Otherwise, the cord may contain a knot larger than the aperture 121 or may attach directly to a plug sized to fit within aperture 121 without pulling through. The cord may have elastic properties to create a constant tension but allow for support caps 110 to be removed from shafts 220 without breaking.

Medial platform portions 130 and lateral platform portions 120 are a part of support caps 110 and individually and in combination may be considered an elongated platform. In this context "elongated" means that the length of the platform is greater than the diameter of the neck 140. Medial platform portion 130 and lateral platform portion 120 may be disposed on each support cap 110. Moreover, medial platform portions 130 and lateral platform portions 120 may be a part of a single platform portion or may alternatively connect or attach together creating a continuous platform. Medial platform portion 130 of support cap 110 may be substantially 55 degrees from a vertical cross-sectional plane A1 defined by a center axis of shaft 220. The term "substantially," in reference to spatial positioning, is generally intended to mean plus or minus 15 degrees throughout this disclosure. Lateral platform portion 120 may be substantially 125 degrees from a vertical cross-sectional plane defined by a center axis of shaft 220. In an open bipod system and device 100 a vertical cross-sectional plane as defined by first shaft 220 may be substantially 70 degrees from a vertical cross-sectional plane A2 as defined by a center axis of second shaft 220. When bipod system and device 100 is open a resting cross-sectional plane may be defined by a line extending between first platform on a first support cap and a second platform on a second support cap, which is substantially parallel to a plane defined by the position of the lower ends of the shafts 220 on the to the ground surface. Both the first and second platform may contain both medial and lateral platform portions 130 and 120. Also, when bipod system and device 100 are open, the medial platform portions 130 and lateral platform portions 120 of opposing support caps 110 are substantially on the same horizontal cross-sectional plane as defined by the medial platform portions 130 and lateral platform portions 120.

An alternate embodiment of support system and device 100 may include a single platform connectable to a first shaft 220. For example, when opened the individual platform may be more permanently attached the top end of first shaft 220 and more temporarily attached to the top end of second shaft 220. When in a stowed position the more permanent attachment to the first shaft may include a hinge that allows the single platform to swing towards a lower portion of the second shaft 220. Attaching the single platform to the top end of the first shaft 220 and the lower end of the second shaft 220 holding both shafts 220 together. Further the single platform may include a handle attached to an end of the platform such that when the platform is in the stowed position the handle extends away from the lower end of the shafts 220 creating a handle to use the support system and device 100 as a walking stick. A similar handle portion may be positioned on the lateral platform portion 120 and or medial platform portion 130 of a dual platform system to provide a handle to use bipod support system and device 100 as a walking stick.

Neck 140 of support caps 110 may include an upper cutout 141 and a lower cutout 142. Upper and lower cutouts 141 and 142 may be defined as an aperture in neck 140 or may be defined as an indentation in neck 140 of support cap 110. The upper and lower cutouts 141 and 142 not only reduce the weight of the bipod system and device 100 but also allow a user to more easily grip support caps 110 even when using gloves. Lower cutout 142 may be a notch in place of a cutout helping the user to locate, using tactile feedback, the bottom of the neck and to reduce weight.

Bipod system and device 100 may include a collar or sheath 210 located below neck 140. Collar 210 may wrap around shaft 220 and extend from neck 140 towards connector 230. Alternatively, collar 210 may extend on the shaft between the shaft 220 and the connector 230. Collar 210 may be composed of a nonabrasive material such as foam (i.e. polyethylene, polyurethane, EVA), cork, and or rubber (i.e. natural, neoprene, silicone, EPDM) or any combination of suitable materials. Collar 210 may also be included on an opposing shaft 220 which in turn creates a resting fork 200. Resting fork 200 may be considered the space from the base of the neck to the connector 230, such that when the bipod system and device is open a spotting scope, firearm, camera etc. may be placed in the resting fork for stability. Resting fork 200 may specifically be used for resting a barrel of a firearm. Resting fork 200 may include collars 210 disposed on both opposing shafts 220 which creating a cushion within the resting fork 200.

Connector 230 connects two opposing shafts 220 and may further allow opposing shafts 220 to scissor and/or rotate. If connector 230 does not provide for rotation one or more of caps 110 may rotate on the shaft(s) 220 to align platforms when bipod system and device 100 is closed. When bipod system and device 100 is closed such that platform portions 130 and 120 are side by side when closed. When bipod system and device 100 is opened the two opposing medial platform portions 130 are generally near each other and opposing lateral platform portions 120 are on opposite ends of each other.

Connector 230 may be an attachment composed of molded plastic, metal, wood, or any other natural or synthetic attachment that connects opposing shafts 220. Connector 230 may also be a pin that is insertable between the opposing shafts 220. To allow rotations of shafts 220 with a pin, channels may be inserted within the shafts or within a channel attached to one or more shaft 220. Rotation of shaft 220 is rotation around a vertical axis defined by the shaft 220.

Figures 4, 5:
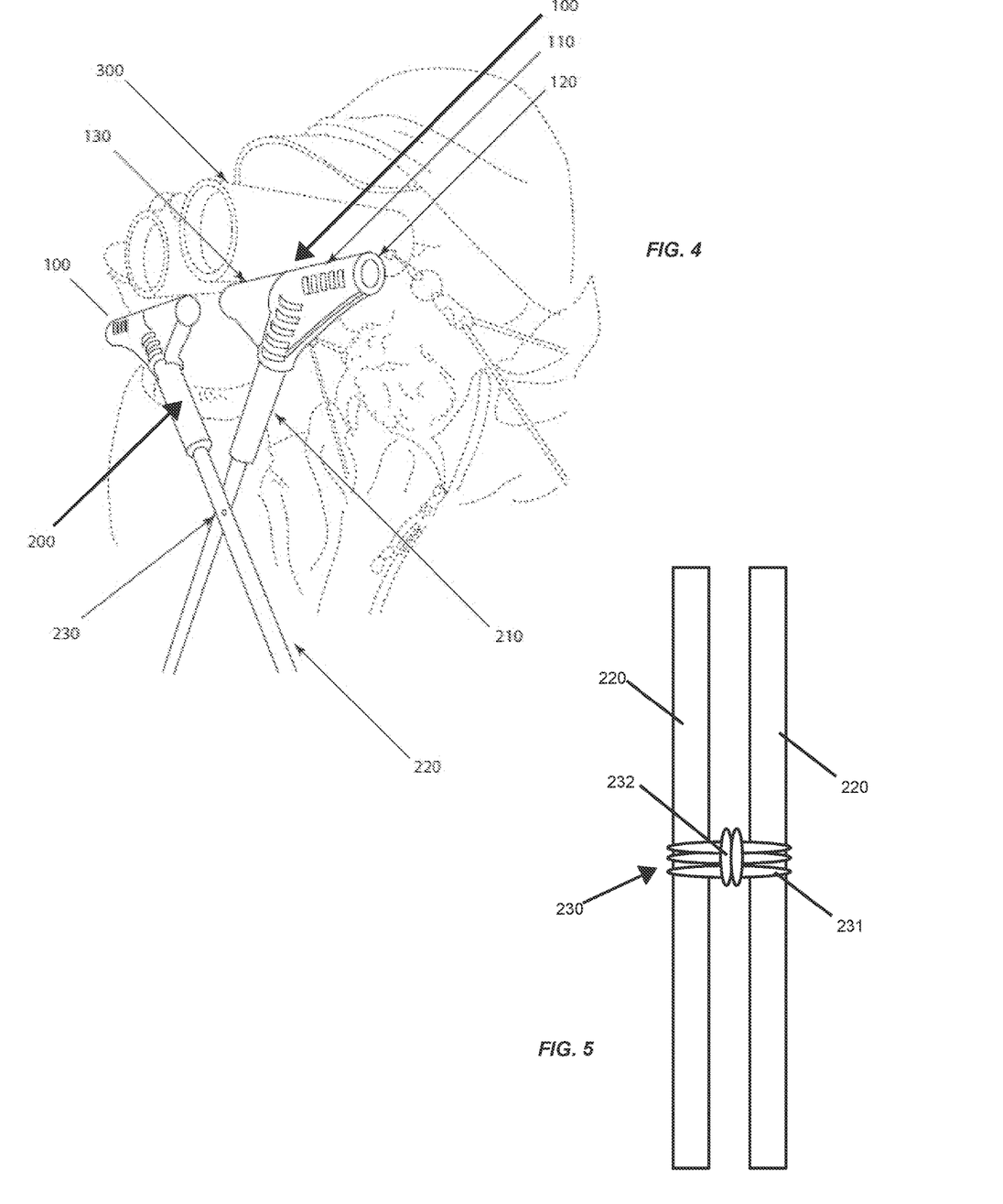
FIG. 4 is an illustrated view of a top portion of an in use open bipod support system and device.
FIG. 5 is an illustrated view of a portion of bipod support system and device with an alternate connector.

As deiced in FIG. 5, connector 230 may be a lashing style connector lashing two opposing shafts 220 together. Connector 230 as a lashing may include various number of wraps and various number of fraps. Depending on the thickness of the lashing material and exemplary lashing may include five wraps and three fraps. The lashing material may include but is not limited to nitrile, EPDM, silicone, neoprene, rubber cord, nylon, polypropylene, polyester, polyethylene etc. Natural materials may also be used such as cotton, jute, hemp but synthetic style ropes are favored for flexibility and weather and friction resistance. Any suitable combination of materials may be used for the lashings. A frap not only holds the wraps together helping to keep the lashing in one location on shafts 220 but also creates a space between opposing shafts 220 to facilitate the opening and closing of the bipod system and device 100. The space between the two shafts may not be required for support system and device 100 to function but may be included in any type of connector 230. Connector 230 may further have locking mechanisms that lock the shafts 220 at different angles. This may include a lock while open and while shut and a lock at various other angles.

Shafts 220 may be telescoping and/or foldable and may contain an internal spring or other mechanisms for shock absorption. Shaft 220 may include an internal hook, loop and/or aperture for attaching the cord that connects support cap 110 to shaft 220. The locking system in shaft 220 may include an external lever lock, push-button lock, twist lock and/a combination lock. Further shaft 220 may include a tip made from a different material to provide better grip and/or increased durability. Shafts 220 may be made of carbon fiber, aluminum, fiberglass steel etc. The tips may include a point to allow penetration into the ground or may contain a flat surface to grip to the surface. The tips may also be removable for repair, to accommodate different terrain, or to accept different types of mounts, such as a vehicle window mount.

Figure 2:
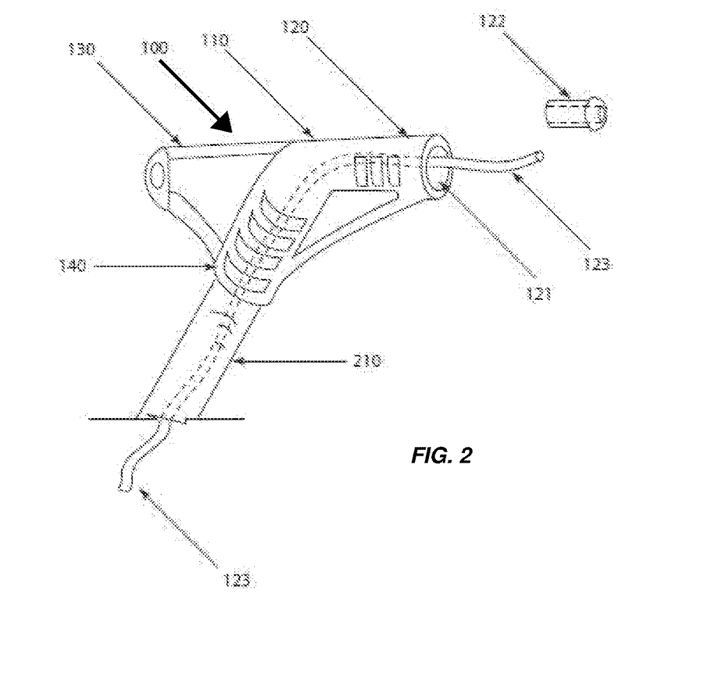
FIG. 2 is an illustrated view of a top portion of a single shaft of a bipod support system and device.

FIG. 2 is an illustrated view of a top portion of a single shaft/side of a bipod support system and device 100, shown in FIG. 1. Bipod support system and device 100 may include support cap 110 attachable to the top end of shaft 220. Support cap 110 contain platforms may be placed on the top of shaft 220 and each platform may work in tandem to create a stage to place an ocular device. Support cap 110 may include a medial platform portion 130 and a lateral platform portion 120. Support cap 110 may be attached to the top of shaft 220 by neck 140 of support cap 110. Attaching support caps 110 may include using various means i.e., adhesive, friction, clamps rivets, bolts, screws, pins. In an alternative embodiment, the top of shaft 220 may be threaded to match the threads of the support cap 110 to screw into place.

Support cap 110 may further include an aperture 121 through which cord 123 may pass after attaching to shaft 220. Cord 123 may attach to shaft 220 to help ensure that support cap 110 remains with the shaft 220 even if it were to be removed from the shaft purposefully or inadvertently. Support cap 110 may include a smaller aperture inset within aperture 121 the same size or slightly larger than cord 123 allowing cord 123 to pass through. Cord 123 may attach direct to support cap 110. Alternatively, cord 123 may include a knot or stopper with a shape larger than the aperture 121. Otherwise, cord 123 may contain a knot larger than the aperture inset within aperture 121 or may attach directly to plug 122 sized to fit within aperture 121. Plug 122 may be fastened to aperture with adhesive or may be secured by friction allowing a user to remove plug 122 and replace support cap 110 if desired. Cord 123 may have elastic properties to create a constant tension while allowing for support caps to be removed from shaft 220 without breaking.

Medial platform portions 130 and lateral platform portions 120 are a part of support caps 110. Medial platform portion 130 and lateral platform portion 120 may be disposed on each support cap 110. Moreover, medial platform 130 and lateral platform 120 may be considered individually and in combination an elongated platform. In this context "elongated" means that the length of the platform is greater than the diameter of the neck 140. Moreover, medial platform portions 130 and lateral platform portions 120 may be a part of a single platform portion or may alternatively connect or attach together creating a continuous platform. Medial platform portion 130 of support cap 110 may be substantially 55 degrees from a vertical cross-sectional plane defined by shaft 220. The term "substantially", in reference to spatial positioning, is generally intended to mean plus or minus 15 degrees throughout this disclosure. Lateral platform portion 120 may be substantially 125 degrees from a vertical cross-sectional plane defined by shaft 220. In an open bipod system and device 100 a vertical cross-sectional plane as defined by a central axis along a length of first shaft 220 is substantially 70 degrees from a vertical cross-sectional plane as defined by a central axis along a length of second shaft 220. When open bipod system and device 100 is open the horizontal cross-sectional plane as defined by a first platform and a second platform is substantially parallel to the ground. Both the first and second platforms may contain both medial and lateral platform portions 130 and 120. Also, when bipod system and device 100 is open medial platform portions 130 and lateral platform portions 120 of opposing support caps 110 are substantially on the same horizontal cross-sectional plane as defined by the medial platform portions 130 and lateral platform portions 120. In an alternate embodiment, apertures may be included below lateral and medial platform portions 120 and 130 of support cap 110 that accommodate connectors such as carabiners or clips to attach items to the bipod or to connect the bipod to a backpack or vehicle for transportation purposes.

Neck 140 of support cap 110 may include an upper cutout and a lower cutout. Upper and lower cutouts may define an aperture or may define an indentation in neck 140 of support cap 110. The cutouts not only reduce the weight of the bipod system and device 100 but may also allow a user to more easily grip the support cap even when using gloves. The cutouts may be a notch in place of a cut helping the user to locate a bottom of the neck and to reduce weight.

Bipod system and device 100 may include a collar that may be located below neck 140. Collar 210 may wrap around the shaft and extend from neck 140 towards a connector. Alternatively, collar 210 may extend below a connector. Collar 210 may be composed of various nonabrasive material such as foam (i.e. polyethylene, polyurethane, EVA), cork, and or rubber (i.e. natural, neoprene, silicone, EPDM.) or any combination of suitable material. Collar 210 may also be included on an opposing shaft 220 which in turn creates a resting fork 200.

Figures 3A, 3B:
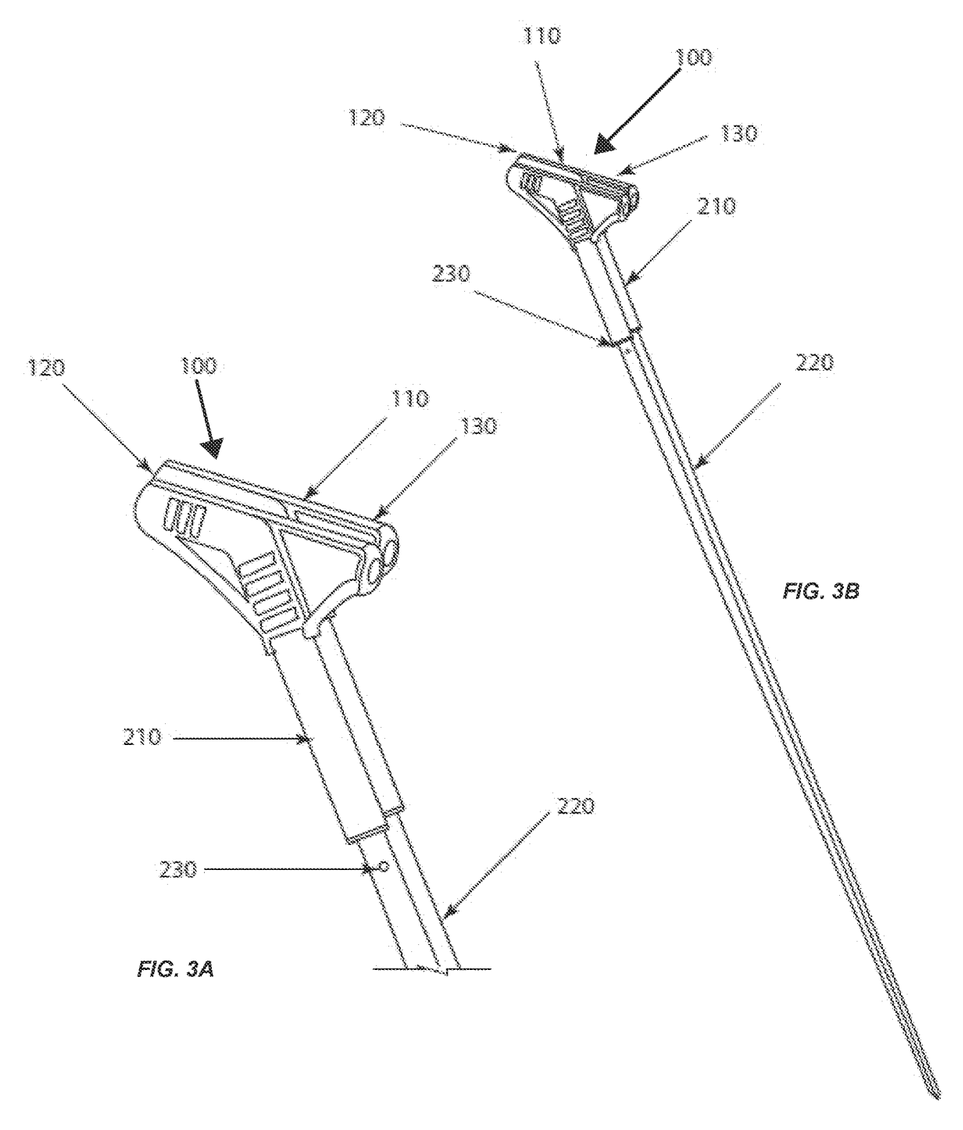
FIG. 3A is an illustrated view of a top portion of a stowed bipod support system and device.
FIG. 3B is an illustrated view of a stowed bipod support system and device.

FIG. 3A is an illustrated view of a top portion of a stowed bipod support system and device 100, shown in FIG. 1. FIG. 3B is an illustrated view of a stowed bipod support system and device. Bipod system and device 100 may include support caps 110 attachable to the top end of each shaft 220. Support caps 110 placed on the top of each shaft 220 may work in tandem to create a dual platform. Support caps 110 may include a medial platform portion 130 and a lateral platform portion 120. Support caps 110 may be attached to the top of shaft 220 through neck 140 of support cap 110. Attaching support caps 110 may include using various techniques known in the art, i.e., adhesive, friction, clamps, rivets, bolts, screws, pins, and other fasteners known in the art. Alternatively, a top of shafts 220 may be threaded to match the threads of the support caps 110 to screw into place. Support caps 110 may further include an aperture that may allow a cord that attaches to a portion of the shaft 220. This cord may be attached to shaft 220 to help ensure that the cap remains with the shaft 220 even if it were to be removed from the shaft purposefully or inadvertently. Support caps 110 may include a smaller aperture inset within aperture 121. Wherein the smaller inset aperture is the same size or slightly larger than the cord, allowing the cord to pass through both the smaller inset aperture and aperture 121. The cord may attach directly to both support caps 110 and shafts 220. The cord may attach to support cap 110 by including a knot or a stopper with a shape larger than the smaller inset aperture but smaller than aperture 121. This allows the knot or stopper to sit within aperture 121.

Otherwise, the cord may contain a knot larger than the aperture 121 or may attach directly to plug sized to fit within aperture 121 without pulling through. The cord may have elastic properties to create a constant tension but allow for support caps to be removed from shaft 220 without breaking.

Medial platform portions 130 and lateral platform portions 120 are a part of support caps 110. Medial platform portion 130 and lateral platform portion 120 may be disposed on each support cap 110. Moreover, medial platform portions 130 and lateral platform portions 120 may be a part of a single platform portion or may alternatively connect or attach together creating a continuous platform. Medial platform portion 130 of support cap 110 may be substantially 55 degrees from a vertical cross-sectional plane defined by a center axis along a length of shaft 220. The term "substantially," in reference to spatial positioning, is generally intended to mean plus or minus 15 degrees throughout this disclosure. Lateral platform portion 120 may be substantially 125 degrees from a vertical cross-sectional plane defined by shaft 220. In an open bipod system and device 100 a vertical cross-sectional plane as defined by first shaft 220 is substantially 70 degrees from a vertical cross-sectional plane as defined by second shaft 220. When bipod system and device is open the horizontal cross-sectional plane as defined by a first platform and a second platform is substantially parallel to the ground. Both the first and second platform may contain both medial and lateral platform portions 130 and 120. Also, when bipod system and device 100 is open medial platform portions 130 and lateral platform portions 120 of opposing support caps 110 are substantially on the same horizontal cross-sectional plane as defined by the medial platform portions 130 and lateral platform portions 120.

Neck 140 of support cap 110 may include an upper cutout 141 and a lower cutout 142. Upper and lower cutouts 141 and 142 may be defined as an aperture in neck 140 or may be defined as an indentation in neck 140 of support cap 110. The upper and lower cutouts 141 and 142 not only reduce the weight of the bipod system and device 100 but also allow a user to more easily grip even when using gloves. Lower cutout 142 may be more of a notch in place of a cutout helping the user to locate the bottom of the neck and to reduce weight.

Bipod system and device 100 may include a collar 210 located below neck 140. Collar 210 may wrap around shaft 220 and extend from neck 140 towards connector 230. Alternatively, collar 210 may extend below connector 230. Collar 210 may be composed of various nonabrasive material such as foam (i.e. polyethylene, polyurethane, EVA), cork, and or rubber (i.e. natural, neoprene, silicone, EPDM.) or any combination of suitable material. Collar 210 may also be included on an opposing shaft 220 which in turn creates a resting fork 200. Resting fork 200 is considered the space from the base of the neck to the connector 230 where when the bipod system and device is open a spotting scope, firearm, camera etc. may be placed in the resting fork for stability. Resting fork 200 may specifically be used for resting a barrel of a firearm. Resting fork 200 may include collars 210 disposed on both opposing shafts 220 which creating a cushion within the resting fork 200.

Connector 230 connects two opposing shafts 220 and may further allow opposing shafts 220 to scissor and/or rotate. If connector 230 does not provide for rotation one or more of caps 110 may rotate to align platforms when bipod system and device 100 is closed. When bipod system and device 100 is closed such that platform portions 130 and 120 are side by side when closed. When bipod system and device 100 is opened, the two opposing medial platform portions 130 are generally near each other and opposing lateral platform portions 120 are on opposite ends of each other.

Connector 230 may be an attachment composed of molded plastic, metal, wood, or any other natural or synthetic attachment that connects opposing shafts 220. Connector 230 may also be a pin that may be insertable between opposing shafts 220. To allow rotations of shafts 220 with a pin, channels may be inserted within the shafts or within a channel attached to one or more shaft 220. Rotation of shaft 220 may be rotation around a vertical axis as defined by the shaft 220.

Connector 230 may be a lashing style connector lashing two opposing shafts 220. Connector 230 as a lashing may include various number of wraps and various number of fraps. Depending on the thickness of the lashing material and exemplary lashing may include five wraps and three fraps. The lashing material may include but is not limited to nitrile, EPDM, silicone, neoprene, rubber cord, nylon, polypropylene, polyester, polyethylene etc. Natural materials may also be used such as cotton, jute, hemp but synthetic style ropes would likely be favored for flexibility and weather and friction resistance. Any suitable combination of materials may be used for the lashings. A frap not only holds the wraps together helping to keep the lashing in one location on shafts 220 but also creates a space between opposing shafts 220 to facilitate the opening and closing of the bipod system and device 100. The space between the two shafts may not be required for the system to function but may be included in any type of connector 230. Connector 230 may further have locking mechanisms that lock the shafts 220 at different angles. This may include a lock while open and while shut and a lock at various other angles.

Shafts 220 may be telescoping and/or foldable and may contain an internal spring or other mechanisms for shock absorption. Shaft 220 may include an internal hook, loop and/or aperture for attaching the cord that connects support cap 110 to shaft 220. The locking system in shaft 220 may include an external lever lock, push-button lock, twist lock and/a combination lock. Further shaft 220 may include a tip made from a different material to provide better grip and/or increased durability. Shafts 220 may be made of carbon fiber, aluminum, fiberglass steel etc. The tips may include a point to allow penetration into the ground or may contain a flat surface to grip to the surface. The tips may also be removable for repair for to accommodate different terrain.

FIG. 4 is an illustrated view of a top portion of an in-use open bipod support system and device 100. Bipod support system and device 100 may include support caps 110 attachable to the top end of each shaft 220. Support caps 110 are placed on a top of each shaft 220 and may work in tandem to create a dual platform surface. Support caps 110 may include a medial platform portion 130 and a lateral platform portion 120. Support caps 110 may be attached to the top of shaft 220 through neck 140 of support cap 110.

Medial platform portions 130 and lateral platform portions 120 are a part of support caps 110. Medial platform portion 130 and lateral platform portion 120 may be disposed on each support cap 110. Moreover, medial platform portions 130 and lateral platform portions 120 may be a part of a single platform or may alternatively connect or attach together creating a continuous platform. Medial platform portion 130 of support cap 110 may be substantially 55 degrees from a vertical cross-sectional plane defined by shaft 220. Substantially, in reference to spatial positioning, is generally intended to mean plus or minus 15 degrees throughout this disclosure. Lateral platform portion 120 may be substantially 125 degrees from a vertical cross-sectional plane defined by shaft 220.

In open bipod system and device 100 a vertical cross-sectional plane as defined by shaft 220 may be substantially 70 degrees from a vertical cross-sectional plane as defined by opposing shaft 220. When bipod system and device 100 is open the horizontal cross-sectional plane as defined by medial platform portion 130 and lateral platform portion 120 may be substantially parallel to the ground. Also, when bipod system and device 100 is open medial platform portions 130 and lateral platform portions 120 of opposing support caps 110 are substantially on the same horizontal cross-sectional plane as defined by the medial platform portions 130 and lateral platform portions 120. Having a platform composed of both medial platform portion 130 and lateral platform 120 provides a surface to support device 300 such as binoculars as depicted. Dual platforms attached to the top of shafts 220 that are parallel to the ground provide a resting place to support device 300.

Bipod system and device 100 may include a collar 210 located below neck 140. Collar 210 may wrap around shaft 220 and extend from neck 140 towards connector 230. Alternatively, collar 210 may extend below connector 230. Collar 210 may be composed of various nonabrasive material such as foam (i.e. polyethylene, polyurethane, EVA), cork, and or rubber (i.e. natural, neoprene, silicone, EPDM.) or any combination of suitable material. Collar 210 may also be included on an opposing shaft 220 which in turn creates a resting fork 200. Resting fork 200 may be the space from the base of the neck to the connector 230 where when the bipod system and device is open a spotting scope, firearm, camera etc. may be placed in the resting fork for stability. Resting fork 200 may specifically be used for resting a barrel of a firearm. Resting fork 200 may include collars 210 disposed on both opposing shafts 220 which creating a cushion within the resting fork 200.

Connector 230 connects two opposing shafts 220 and may further allow opposing shafts 220 to scissor and/or rotate. When bipod system and device 100 is closed such that platform portions 130 and 120 are side by side when closed. When bipod system and device 100 is opened the two opposing medial platform portions 130 are generally near each other and opposing lateral platform portions 120 are on opposite ends of each other.

Connector 230 may be an attachment composed of molded plastic, metal, wood, or any other natural or synthetic attachment that connects opposing shafts 220. Connector 230 may also be a pin that may be insertable between opposing shafts 220. To allow rotations of shafts 220 with a pin, channels may be inserted within the shafts or within a channel attached to one or more shaft 220. Rotation of shaft 220 may be a rotation around a vertical axis as defined by the shaft 220. Connector 230 may be a lashing style connector lashing two opposing shafts 220. Connector 230 as a lashing may include various number of wraps and various number of fraps. Depending on the thickness of the lashing material and exemplary lashing may include five wraps and three fraps. The lashing material may include but is not limited to nitrile, EPDM, silicone, neoprene, rubber cord, nylon, polypropylene, polyester, polyethylene etc. Natural materials may also be used such as cotton, jute, hemp but synthetic style ropes would likely be favored for flexibility and weather and friction resistance. Any suitable combination of materials may be used for the lashings.

A frap not only holds the wraps together helping to keep the lashing in one location on shafts 220 but also creates a space between opposing shafts 220 to facilitate the opening and closing of the bipod system and device 100. The space between the two shafts may not be required for the system to function but may be included in any type of connector 230. Connector 230 may further have locking mechanisms that lock the shafts 220 at different angles. This may include a lock while open and while shut and a lock at various other angles in between.

Shafts 220 may be telescoping and/or foldable and may contain an internal spring or other mechanisms for shock absorption. Shaft 220 may include an internal hook, loop and/or aperture for attaching the cord that connects support cap 110 to shaft 220. The locking system in shaft 220 may include an external lever lock, push-button lock, twist lock and/a combination lock. Further shaft 220 may include a tip made from a different material to provide better grip and/or increased durability. Shafts 220 may be made of carbon fiber, aluminum, fiberglass steel etc. The tips may include a point to allow penetration into the ground or may contain a flat surface to grip to the surface. The tips may also be removable for repair for to accommodate different terrain.

FIG. 5 is an illustrated view of a portion of bipod support system and device 100 with an alternate connector 230. Connector 230 may be a lashing style connector 230 lashing two opposing shafts 220 together. Connector 230 as a lashing may include various number of wraps 231 and various number of fraps 232. Connector 230 may include a traditional lashing in which wraps 231, as with the fraps 232, are fashioned using a single rope or cord. Another embodiment may include wraps 231 and/or fraps 232 as being individual rings that may include elastic properties. Lashing connector 230 may allow the rotation around a vertical axis as define by shaft 220 that aids in aligning the platforms connected to the top of shafts 220.

The lashing material may include but is not limited to nitrile, EPDM, silicone, neoprene, rubber cord, nylon, polypropylene, polyester, polyethylene etc. Natural materials may also be used such as cotton, jute, hemp but synthetic style ropes are favored for flexibility and weather and friction resistance. Any suitable combination of materials may be used for the lashings. Frap 232 not only holds the wraps together helping to keep the lashing in one location on shafts 220 but also creates a space between opposing shafts 220 to facilitate the opening and closing of the bipod system and device 100. The space between the two shafts may not be required for support system and device 100 to function but may be included in any type of connector 230.

The foregoing description is presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:
1. A bipod system comprising:
 a bipod comprising:
  a first shaft,
  a second shaft, a connector connected to the first shaft and the second shaft;

a first elongated platform attached to the first shaft, the first elongated platform having a medial end and a distal end and a lateral portion extending between the medial end and the distal end;

a second elongated platform attached to the second shaft, the second elongated platform having a medial end and a distal end and a lateral portion extending between the medial end and the distal end; and wherein the first elongated platform is selectively moveable from a deployed position to an undeployed position, such that in the deployed position the medial ends of the first elongated platform and the second elongated platform face one another with the distal ends of the first elongated platform and the second elongated platform extending away from one another.

2. The bipod system of claim 1, wherein in undeployed position the first elongated platform and the second elongated platform are generally near each other and have a common medial end to distal end direction.

3. The bipod system of claim 2, wherein the medial end of the first elongated platform is closer to a vertical cross-sectional plane defined by the first shaft than the lateral portion of the first elongated platform.

4. The bipod system of claim 3, wherein when the bipod is open a horizontal cross-sectional plane as defined by the first elongated platform is substantially parallel to the ground.

5. The bipod system of claim 1, wherein the first elongated platform is rotatable around an axis defined by the first shaft.

6. The bipod system of claim 1, wherein the first elongated platform is attached to a cap that is attached to the first shaft.

7. The bipod system of claim 6, wherein the second elongated platform is attached to a cap that is attached to the second shaft.

8. The bipod system of claim 1, wherein the connector comprises a lashing wrapped around the first shaft and second shaft.

9. The bipod system of claim 1, wherein the second elongated platform is selectively moveable from a deployed position to an undeployed position.

10. The bipod system of claim 9, wherein the second elongated platform is rotatable around an axis defined by the second shaft.

11. The bipod system of claim 1, wherein the second elongated platform is rotatable around an axis defined by the second shaft.

12. The bipod system of claim 1, further comprising a first collar disposed on the first shaft.

13. The bipod system of claim 12, further comprising a a second collar disposed on the second shaft.

* * * * *